United States Patent [19]

Scheler

[11] 4,006,654
[45] Feb. 8, 1977

[54] ARRANGEMENT FOR FEEDING ROD SHAPED WORKPIECES TO A MACHINE TOOL

[75] Inventor: Holger Scheler, Klausdorf, Schwentine, Germany

[73] Assignee: Hagenuk vormals Neufeld & Kuhnke GmbH, Kiel, Germany

[22] Filed: July 9, 1975

[21] Appl. No.: 594,285

[52] U.S. Cl. .............................................. 82/38 A
[51] Int. Cl.² ..................................... B23B 25/00
[58] Field of Search .................. 82/38 A, 2.5, 2.7

[56] References Cited

UNITED STATES PATENTS

| | | | |
|---|---|---|---|
| 1,904,329 | 4/1933 | Rich .................................... | 82/38 A |
| 2,619,712 | 12/1952 | Bechler et al. ..................... | 82/38 A |
| 3,131,587 | 5/1964 | Spohn et al. ........................ | 82/2.7 |
| 3,541,904 | 11/1970 | Gurtner .............................. | 82/38 A |
| 3,693,810 | 9/1972 | Gumhold ........................... | 82/38 A |

Primary Examiner—Leonidas Vlachos
Attorney, Agent, or Firm—Michael J. Striker

[57] ABSTRACT

An arrangement for feeding rod-shaped workpieces to a machine tool comprises an elongated hollow guide member for accommodating a respective workpiece therein. A support structure extends longitudinally of the guide member and surrounds the same with spacing, and a plurality of elongated elastically yieldable members extends longitudinally of the guide member in the spacing and supports the guide member in the support structure. The oscillations to which the guide member is subjected during the operation of the arrangement are damped by the elastically yieldable members so that they are not transmitted to the support structure. The elastically yieldable members may be hollow tubes into which a pressurized medium is introduced, and the pressure of the medium may be adjusted so as to correspond to the various working conditions. The guide member and the support structure may be constituted by several coextensive sections, the sections of the support structure being mounted on one another for pivoting about an axis which extends parallel to the elongation of the sections between an open position in which the workpiece can be introduced into the guide member and a closed position. A control arrangement is also disclosed which controls the pressure inside the hollow tubes and interrupts the electric circuit of the machine tool as long as the pressure inside the hollow tubes is below a threshold value.

7 Claims, 10 Drawing Figures

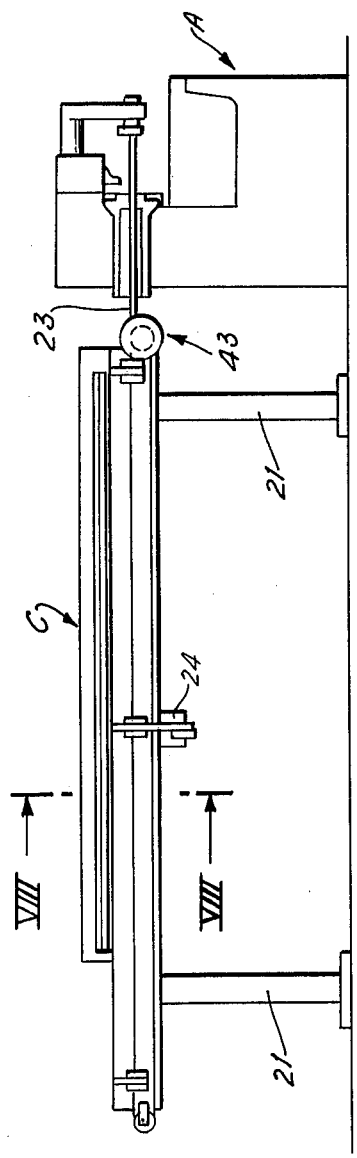
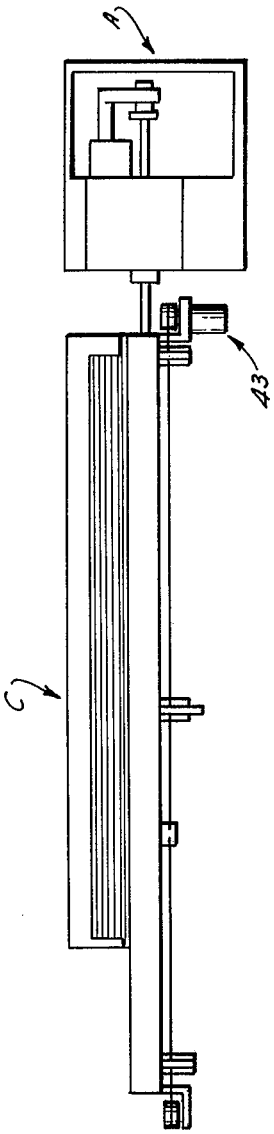
FIG. 6
FIG. 7

ARRANGEMENT FOR FEEDING ROD SHAPED WORKPIECES TO A MACHINE TOOL

BACKGROUND OF THE INVENTION

The present invention relates to a feeding arrangement, and more particularly to an arrangement for feeding rod-shaped workpieces to a machine tool.

There are already known various machine tools, in particular lathes, which perform material-removing operations on rod-shaped workpieces. In connection with such machine tools, it is already known to support the rod-shaped workpiece along its length, particularly by accommodating the rod-shaped workpiece in a tubular guide member. Experience with this type of arrangement has shown that, especially when the workpiece rotates in the guide member, the latter is subjected to oscillations which, when the guide member is rigidly mounted on a support structure, are transmitted to such support structure and via the same to the environment of the machine tool, which is a very undesirable situation.

In order to avoid this disadvantage, it is already known to provide a feeding arrangement in which such oscillations are damped so that their transmission to the support structure is avoided. In one of such conventional arrangements, the support structure includes a jacket tube and a guide member is accommodated in the jacket tube with spacing therefrom, the spacing being filled with a flowable material, particularly sand. The edge portions of the jacket tube and the guide member are rigidly and sealingly connected to one another so as to prevent the flowable material from escaping from the spacing. However, this arrangement is disadvantageous in several respects. First of all, the connection of the end portions of the jacket tube and the guide member to one another constitutes oscillation transmitting bridges which impair the oscillation damping characteristic of this arrangement. Furthermore, when it is necessary to substitute a new guide member for the one previously used, either because the previous guide member has been worn out, or because it is desired to feed rod-shaped workpieces of different diameters into the machine tool, it is necessary to replace the entire assembly. This, of course, is very disadvantageous because it requires keeping in stock a plurality of such complete assemblies, rather than just an assortment of guide members of different diameters.

SUMMARY OF THE INVENTION

It is a general object of the present invention to avoid the disadvantages of the prior art arrangements.

It is a further object of the present invention to provide an arrangement for feeding rod-shaped workpieces to a machine tool which arrangement possesses excellent oscillation-damping characteristics.

It is a still further object of the present invention to provide a feeding arrangement in which all oscillation transmitting bridges are eliminated.

It is yet another object of the present invention to provide a feeding arrangement in which the damping behavior can be adjusted to suit various working conditions.

It is a concomittant object of the present invention to provide a feeding arrangement for machine tools which permits simple replacement of the workpiece guide member.

Still another object of the present invention is to provide a feeding arrangement which simplifies the introduction of the rod-shaped workpieces into the guide member.

In pursuance of these objects and others which will become apparent hereafter, one feature of the present invention resides, in an arrangement for feeding rod-shaped workpieces to a machine tool, in a combination comprising an elongated hollow guide member for accommodating a workpiece therein; support means extending longitudinally of the guide member and surrounding the same with spacing; and a plurality of elongated elastically yieldable members extending longitudinally of the guide member in said spacing and operative for supporting the guide member in the support means and for damping oscillations to which the guide member is subjected during the operation of the arrangement so as to prevent transmission of the oscillations to said support means.

In a currently preferred embodiment of the present invention, the elastically yieldable members are hollow tubes which are filled with pressurized medium.

It is currently preferred that the hollow tubes of elastically yieldable material extend parallel to the guide member and be filled with a gaseous medium such as air, or a fluid medium, such as oil of high viscosity. The pressure of the pressurized medium in the hollow tubes can be varied in order to obtain excellent oscillation damping at various frequencies of the oscillating movements. The guide member, e.g. a tube, is supported on the hollow tubes of elastically yieldable material in such a manner that it can be removed from the arrangement and substituted by another guide member when the pressure inside the hollow tubes has been relieved. Thus, the arrangement of the present invention is very versatile and the replacement of the guide member by a different one is a very simple operation.

According to another currently preferred embodiment of the present invention, the guide member as well as the jacket which surrounds the same with spacing and which forms part of the support structure are constituted by several coextensive sections, each of the sections of the guide tube being supported by said elastically yieldable hollow tubes in one of the sections of the jacket, and the jacket sections are mounted on one another for displacement with respect to each other so as to permit displacement of the sections between an open position in which a workpiece can be introduced into the guide member, and a closed position in which the guide member completely surrounds the workpiece. Preferably, the sections are mounted on one another for pivoting about an axis which extends parallel to the elongation of the guide member and an arrangement is provided which pivots at least one of the sections of the jacket about such axis between the open and the closed position. An arrangement may be provided for introducing the workpieces into the guide member when the sections are in their open position.

Another important feature of the present invention resides in the provision of a pressure switch which controls the electric circuit of the machine tool in such a manner that the electric circuit is interrupted as long as the pressure inside the hollow tubes supporting the guide member is below a threshold value.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 6 is a side elevational view of another embodiment of the present invention;

FIG. 7 is a top plan view of the embodiment of FIG. 6;

DESCRIPTION OF THE PREFERRED EMBODIMENTS

Figure 1:
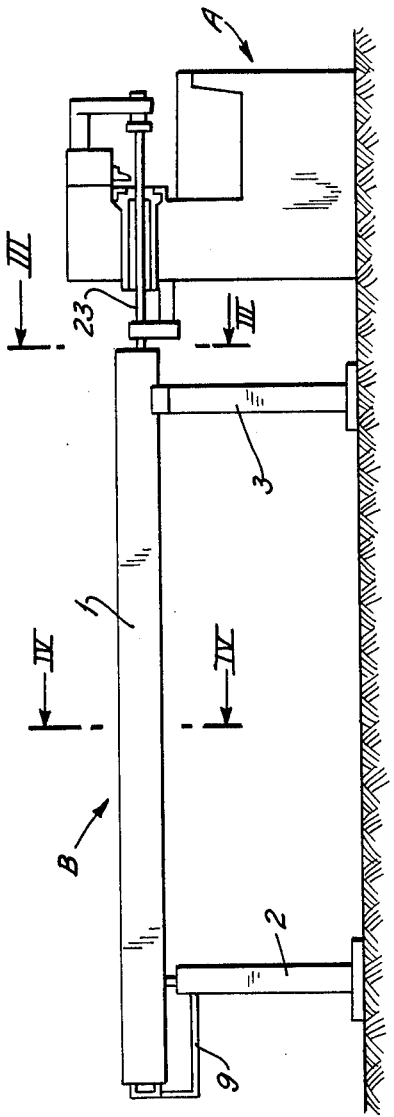
FIG. 1 is a side elevational view of a first embodiment of the present invention.
Figure 2:
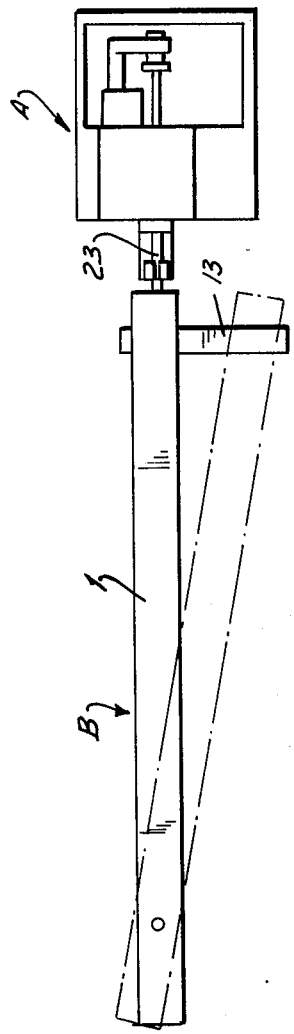
FIG. 2 is a top plan view of the embodiment of FIG. 1.
Figure 3:
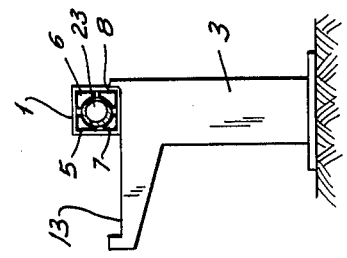
FIG. 3 is a cross-sectional view taken on line III—III of FIG. 1.
Figure 4:
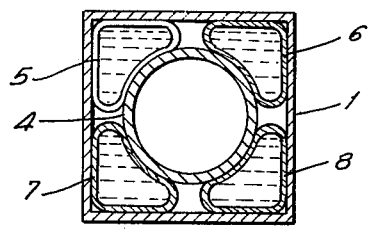
FIG. 4 is an enlarged cross-sectional view taken on line IV—IV of FIG. 1.

Referring now to the drawings, and first to FIGS. 1 – 5 which illustrate one embodiment of the arrangement of the present invention, it may be seen therein that the machine tool has been assigned a general reference character A, while the assembled arrangement of the present invention is designated in general by reference character B. The machine tool A is of a conventional construction, so that it need not be discussed in detail. It is only pointed out that this machine tool includes an arrangement for advancing the rod-shaped workpiece 23 longitudinally thereof. The feeding arrangement B, as best seen in FIG. 4, includes a circumferentially complete one-piece jacket tube 1 which surrounds with spacing a guide member 4 of tubular configuration. A plurality of hollow tubes of elastically yieldable material, which are designated with reference numerals 5, 6, 7 and 8, is located around the guide member 4 and supports the same in the jacket 1 concentrically thereto. A guide member 4 and the hollow tubes 5, 6, 7 and 8 extend parallel to the jacket tube 1 over the entire length thereof. The hollow tubes 5, 6, 7 and 8 are made of an elastic material such as rubber, and are closed at their ends which face the machine tool A. As illustrated in FIGS. 1 – 3 the assembly B is supported on two supports 2 and 3 for pivoting about a vertical axis on the support 2 and for sliding over a substantially horizontal surface 13 on the support 3. In the position of the arrangement B that is illustrated in FIG. 2 in full lines, the arrangement is ready for feeding the rod-shaped workpiece to the machine tool A, while a rod shaped workpiece can be inserted into the guide tube 4 from the end of the arrangement B which faces the machine tool A when the arrangement B is in its dash-dotted position. A conduit 9 communicates with the hollow tubes 5, 6, 7 and 8 at the ends which are distant from the machine tool A.

Figure 5:
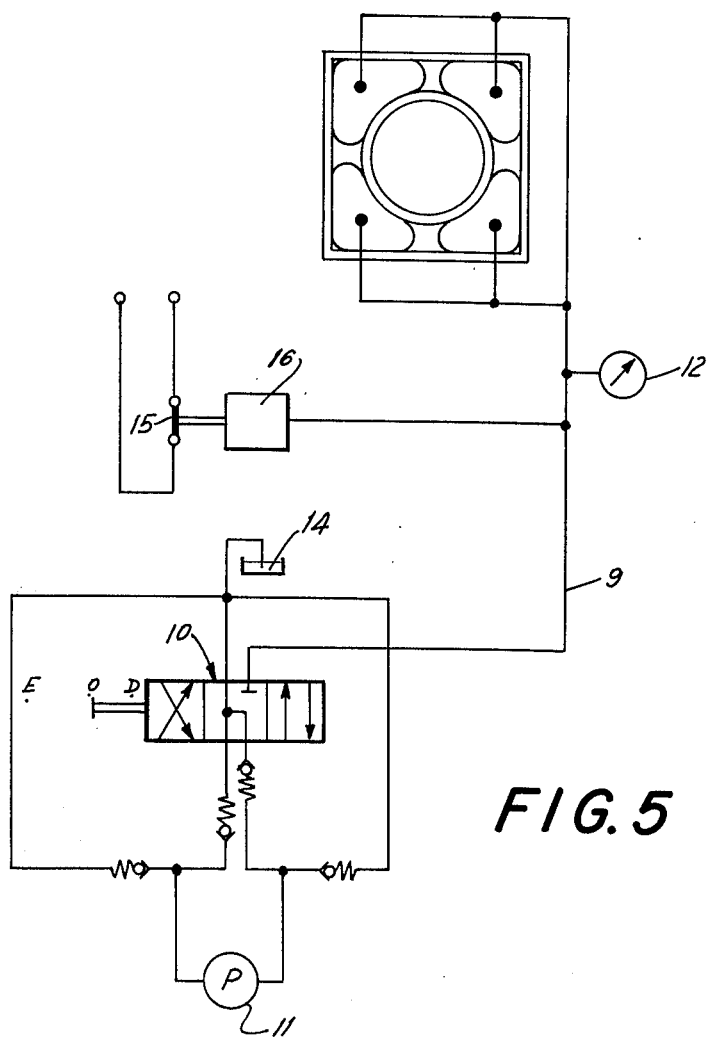
FIG. 5 is a diagrammatic view similar to FIG. 4 and illustrating the pressurized medium feeding and withdrawing arrangement.

The conduit 9 is part of a hydraulic or pneumatic system which is illustrated in more detail in FIG. 5.

Such a system includes a source of pressurized medium which includes a pump 11, and in the illustrated hydraulic embodiment of the present invention, also a reservoir 14 for the hydraulic fluid. Of course, when the pressurized medium used in the system is air, the reservoir 14 can be omitted, and the inlet side of the pump may communicate with the ambient atmosphere.

The pressurized medium system further includes a three-position four-port valve 10 which is mounted for movement between three positions designated as E, O, D. Such a valve 10 is of conventional construction so that its operation need not be discussed in any great detail. It suffices to say that in the illustrated position 0 the communication of the conduit 9 with the pump 11 is interrupted, as is the communication of the conduit 9 with the reservoir 14. On the other hand, when the valve 10 is moved toward the right, that is into the position D, the conduit 9 will communicate with the outlet side of the pump 11 and the pressurized medium will be delivered to the hollow tubes 5, 6, 7 and 8. Conversely, in the position E, the conduit 9 will communicate with the inlet side of the pump 11 and with the reservoir 14 so that the pressure in the hollow tubes 5, 6, 7 and 8 will be relieved.

A pressure measuring device 12 communicates with the conduit 9 and indicates the pressure prevailing therein and thus in the hollow tubes 5, 6, 7 and 8. A pressure operated switch 16 also communicates with the conduit 9 and has a contact element 15 interposed in the electric circuit of the machine tool. When the pressure in the conduit 9 and thus in the hollow tubes 5, 6, 7 and 8 is below a certain preselected minimum value, the contact element 15 is opened and thus the machine tool A cannot be energized. On the other hand, once the pressure in the conduit 9 exceeds a threshold value, the contact element 15 closes the circuit of the machine tool A, and operation of the latter can be commenced.

It will be appreciated from the above discussion of the structure of the arrangement B that, when the guide member 4 is to be substituted by a different guide member, the pressure in the hollow tubes 5, 6, 7 and 8 is relieved by moving the three-position four-port valve into its position E so that the guide member can be easily removed from the jacket 1 longitudinally thereof, and another guide member 4 introduced instead. Once the guide member 4 is properly introduced into the jacket 1, the valve 10 is moved to its position D so that the pressurized medium is introduced via the conduit 9 into the hollow tubes 5, 6, 7 and 8 which expand and center the guide member 4 with respect to the jacket 1. By controlling the pressure in the conduit 9 which may be ascertained from the measuring device 12, it is possible to give the hollow tubes 5, 6, 7 and 8 such oscillation damping characteristics as to prevent the transmission of the oscillations to the jacket 1 at any frequency of oscillation. In this connection, it should be mentioned that the oscillations will be damped regardless of their origin, but that this arrangement is particularly advantageous for damping oscillations which result from the rotation of the rod-shaped workpiece in the guide member 4.

It will be seen that this embodiment of the present invention is particularly simple and satisfies all of the above-mentioned requirements, particularly the requirement for simple replacement of the guide member 4, the requirement for adjusting the oscillation-damping characteristics of the elastically yieldable members supporting the guide member and the requirement for simple construction and operation of the arrangement.

The embodiment of the arrangement C of the present invention illustrated in FIGS. 6 to 10 is in many respects similar to that discussed in connection with FIGS. 1 – 5, so that similar reference numerals have been used to designate similar parts of the arrangement C. In this embodiment, the machine tool A does not have any arrangement for advancing the rod-shaped workpiece 23 longitudinally thereof, so that an advancing arrangement 43 is provided which forms part of the arrangement C. The advancing arrangement 43 is of a conventional design so that it will not be described in any detail. It is sufficient to say that it includes a motor which drives a pulley, and and an endless element is moved when the pulley rotates and advances the workpiece 23 in the arrangement C.

Figure 8:
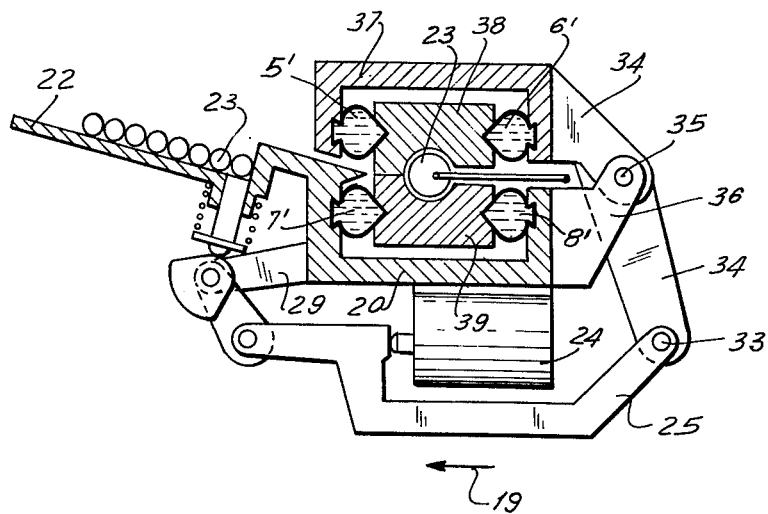
FIG. 8 is an enlarged cross-sectional view taken on line VIII—VIII of FIG. 6.
Figure 10:
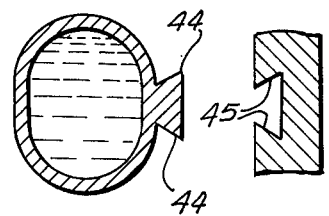
FIG. 10 is an enlarged exploded cross-sectional view illustrating the connection of one of the hollow tubes with the jacket.
Figure 9:
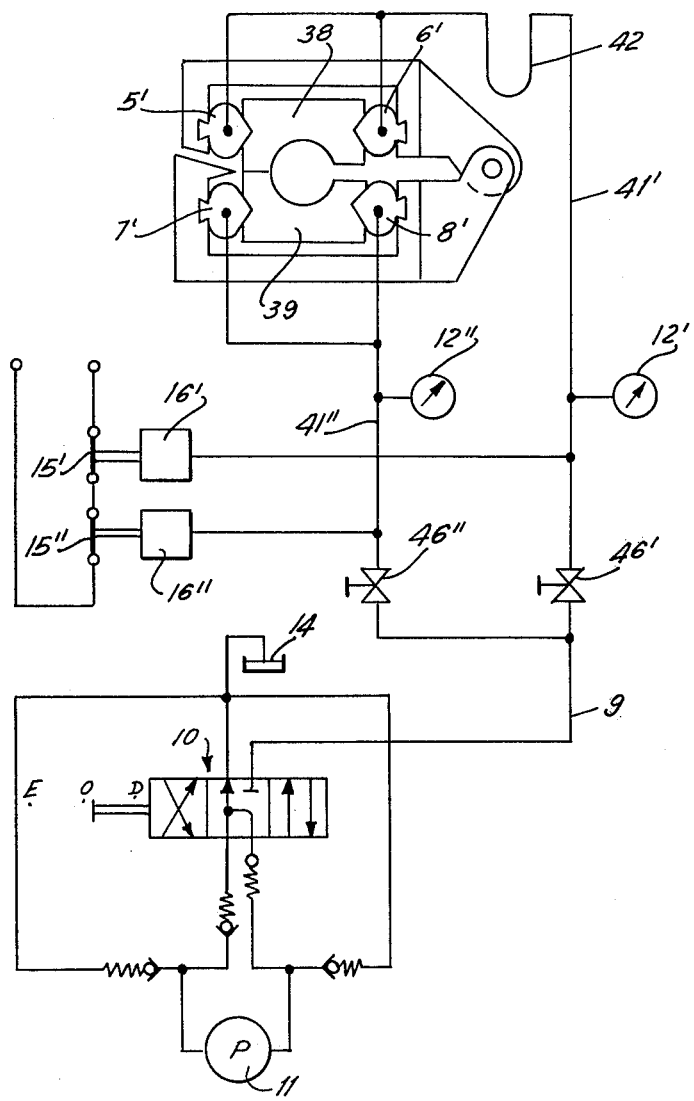
FIG. 9 is a diagrammatic view similar to FIG. 8, and illustrating the pressurized medium supplying and withdrawing arrangement.

As illustrated in FIG. 8, the support structure or jacket of this embodiment includes a lower jacket section 20 which is supported on supports 21 (FIG. 6) and an upper jacket section 27. Similarly, the guide member has a lower section 39 and an upper section 38 which together bound a channel for receiving the rod-shaped workpiece 23 therein. Hollow tubes 5' and 6' support the guide section 28 in the jacket section 27, and hollow tubes 7' and 8' support the guide section 39 in the jacket section 20.

An inclined storage portion 22 for supply of the rod-shaped workpieces 23 extends parallel to the lower jacket section 20. A plurality of lugs 29 is connected to and projects transversely of the lower jacket section 20, and a shaft 28 is supported thereon for rotation about its axis. A plurality of cams 30 is supported on the shaft 28 for shared rotation therewith, and at least one lever 27 is connected to the shaft 28 for angular displacement therewith. A link 25 is pivoted to the lever 27 at 26 and carries a support pivot 33 at its other end. A plurality of lugs 36 connected to the lower jacket section 20 supports a shaft 35, and at least one lever 34 is provided which is pivotably connected to the link 25 by means of the support pivot 33 and is also connected to the shaft 35 for angular displacement therewith.

Finally, a plurality of lugs 34 is connected to the upper jacket section 37 and also to the shaft 35 for rotation therewith. An electromagnet 24 is rigidly connected to the lower support section 20 underneath the same and has a projection which abuts against the link 25.

A plurality of pins 31 is supported in the portion 22 for axial movement, all of the pins 31 being in contact with one of the rod-shaped workpieces 23 and each of the pins 31 being urged by a spring 40 into contact with the respective cam 30.

The above-described arrangement operates as follows:

When the channel bounded by the guide sections 38 and 39 is empty, a conventional sensing arrangement which need not be discussed in any detail detects this situation and energizes the electromagnet 24 whose actuating part then moves in the direction of the arrow 19, that is leftwardly in FIG. 8. Thus, the link 25 is displaced also in the leftward direction which causes the lever 27 and the shaft 28 connected thereto to rotate in a clockwise direction so that the contact surface of each cam 30 moves the associated pin 31 against the force of the spring 40 generally in the upward direction so that the pins 31 lift the respective rod-shaped workpiece 23 off the inclined portion 22 and beyond an edge 32. Simultaneously therewith, the movement of the link 25 causes the lever 34 and the shaft 35 to also rotate in the clockwise direction so that the lugs 34 are also rotated in the same direction with attendant movement of the jacket or support section 37 into its open position. Thus, the respective workpiece 23 which is lifted over the edge 32 rolls on the inclined surface and into the guide channel. Once the workpiece 23 is accommodated in the semi-circular channel of the guide section 39, the electromagnet 24 is deenergized so that the link 25 and the parts connected thereto return into their original positions illustrated in FIG. 8 so that the workpiece is fully accommodated in the channel.

Similarly to the embodiment described previously, the sections 20, 37, 38, and 39 as well as the hollow tubes 5', 6', 7' and 8' are coextensive in the longitudinal direction thereof. The hollow tubes 5' and 6' hold the guide section 38 in the jacket or support section 37, and the hollow tubes 7' and 8' hold the guide section 29 in the jacket or support section 20, in coaxial relation with respect to one another.

In order to prevent displacement of the hollow tubes 5', 6', 7' and 8' with respect to the jacket sections 20 and 37 when the sections are in their open position, the sections 37 and 20 are formed with dove-tailed recesses 35 and the hollow tubes 5', 6', 7' and 8' are provided with dove-tailed projections 44 which are lodged in the recesses 45. On the other hand, the guide sections 38 and 39 are formed with recesses into which the hollow tubes 5', 6', 7' and 8' enter when they are charged with pressurized medium, which recesses serve the purpose of assuring the proper position of the guide sections 39 and 38 with respect to the jacket sections 20 and 27, respectively.

The oscillation-damping hollow tubes 5', 6', 7' and 8' are made of an elastic material and are closed at their ends which face the machine tool A. At the other ends, the hollow tubes 5', 6', 7' and 8' communicate with the supply conduit 9, and the communication will now be described in detail with reference to FIG. 9. Since the pressurized medium supply and valve arrangement of this embodiment is the same as that described previously in connection with FIGS. 1 – 5, this part of the supply system will not be repeatedly discussed. It suffices to say that the conduit 9 is subdivided into two branches 41' and 41" each of which can be separately controlled by means of valves 46' and 46". The branch 41" communicates with the hollow tubes 7' and 8', whereas the branch 41' communicates with the hollow tubes 5' and 6'. Respective measuring devices 12' and 12" communicate with the respective branches 41' and 41" and indicate the pressure prevailing therein. Inasmuch as the lower part of the assembly is stationary, the branch 41' can be rigid; on the other hand, the upper half of the assembly is mounted on the lower part for pivoting with respect thereto, so that the branch 41' has to include at least a flexible portion 42 which compensates for the displacement of the upper part of the assembly. As a result of this arrangement, the guide sections 28 and 39 can be replaced individually.

Because it is necessary to prevent energization of the machine tool A as long as the pressure in either of the branches 41' and 41" is below a certain threshold valve, two pressure operated switches 15' and 15" are provided each associated with one of the branches 41' and 41″, and their operation and cooperation with the contact elements 15′ and 15″ are similar to those of the pressure-operated switch 15 described previously except that both contact elements 15′ and 15″ must be in their closed positions in order to be able to commence the operation of the machine A. The operation of the three-position four-port valve 10 is the same as already discussed above in connection with the embodiments of FIGS. 1 – 5. This valve 10 is again mounted for movement between three positions O, E and D, wherein the conduit 9 does not communicate with either the pump 11 or with the reservoir 14 when the valve is in the position O, wherein pressurized medium is supplied to the conduit 9 from the pump 11 when the valve 10 is in its position D, and wherein the pressure in the conduit 9 is relieved when the valve 10 is in its position E.

It will be understood that each of the elements described above, or two or more together, may also find a useful application in other types of support and guide arrangements, differing from the types described above.

While the invention has been illustrated and described as embodied in an arrangement for feeding rod-shaped workpieces to a machine tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. In an arrangement for feeding rod-shaped workpieces to a machine tool, a combination comprising an elongated hollow guide member for accommodating a respective workpiece therein; support means extending longitudinally of said guide member and surrounding the same with spacing; and a plurality of elongated elastically yieldable hollow tubes filled with pressurized fluid, said tubes extending longitudinally of said guide member in said spacing and being operative for supporting said guide member on said support means and for damping oscillations to which said guide member is subjected during the operation of the arrangement so as to prevent transmission of the oscillations to said support means.

2. A combination as defined in claim 1, and further comprising means for supplying the pressurized fluid into, and withdrawing the same from, said hollow tubes.

3. A combination as defined in claim 2, wherein said last-mentioned means includes a source of the pressurized fluid; and valve means for controlling the supply of the pressurized fluid to, and withdrawal thereof from, said hollow tubes.

4. A combination as defined in claim 3, wherein said valve means includes at least two valves for independently controlling the pressure of said pressurized fluid in at least two sets of said hollow tubes.

5. A combination as defined in claim 1, and further comprising means for indicating the pressure in said hollow tubes.

6. A combination as defined in claim 1, and further comprising means for detecting the pressure in said hollow tubes and for energizing the machine tool in dependence thereon.

7. A combination as defined in claim 6, wherein said detecting means includes a pressure switch in the electric circuit of the machine tool and operative for interrupting said electric circuit as long as said pressure in said hollow tubes is below a threshold value.

* * * * *